(12) United States Patent
Cowan et al.

(10) Patent No.: US 7,644,283 B2
(45) Date of Patent: Jan. 5, 2010

(54) MEDIA ANALYSIS METHOD AND SYSTEM FOR LOCATING AND REPORTING THE PRESENCE OF STEGANOGRAPHIC ACTIVITY

(76) Inventors: William W. Cowan, 11101 Aldenburgh, Austin, TX (US) 78737; Steven Rogers, 2711 Holly Springs Ct., Austin, TX (US) 78748; William R. Rice, 3601 Travis Country Cir., Austin, TX (US) 78731

( * ) Notice: Subject to any disclaimer, the term of this patent is extended or adjusted under 35 U.S.C. 154(b) by 344 days.

(21) Appl. No.: 11/420,665

(22) Filed: May 26, 2006

(65) Prior Publication Data
US 2006/0206715 A1   Sep. 14, 2006

Related U.S. Application Data

(63) Continuation-in-part of application No. 10/314,853, filed on Dec. 9, 2002.

(60) Provisional application No. 60/684,838, filed on May 26, 2005.

(51) Int. Cl.
*H04L 9/00* (2006.01)
*G06F 7/04* (2006.01)

(52) U.S. Cl. .............. 713/176; 713/177; 713/178; 713/179; 380/231; 380/232; 380/233; 380/234; 726/27; 726/28; 726/29; 726/30

(58) Field of Classification Search .............. 713/176
See application file for complete search history.

(56) References Cited

U.S. PATENT DOCUMENTS

| 6,724,914 | B2 * | 4/2004 | Brundage et al. | ......... 382/100 |
| 2004/0022444 | A1 * | 2/2004 | Rhoads | ......... 382/232 |

OTHER PUBLICATIONS

Chandramouli et al. ("A Distributed Detection Framework for Staganalysis", ACM conference Oct. 20, 2000).*
Dittmann (Manipulating digital world—Challenge and legal aspects of multimedia cryptography, steganalysis and watermarking, ACM conference Dec. 1, 2002.*

* cited by examiner

*Primary Examiner*—Longbit Chai
(74) *Attorney, Agent, or Firm*—Hulsey Intellectual Property Lawyers, P.C.

(57) ABSTRACT

A method and system for surreptitiously detecting and analyzing sites suspected of transferring steganographic communications, is accomplished by analyzing a targeted site for steganographic communications via a server that directs a plurality of clients to analyze the targeted site. The clients are dispatched according to the objectives of the server and the data retrieved by previous clients, which have been directed to scan the site. The client's data is aggregated and analyzed to determine if a steganographic communication is present.

22 Claims, 13 Drawing Sheets

| 1.URL | 1.The URL to examine, or a null URL instructing the client to standby for an interval |
|---|---|
| 1.SCAN TYPE | 1.Instructs the client to perform a full traversal or to scan a single page and return links |
| 1.CURRENT VERSION | 1.Version identifier specifying the current versions for detection algorithms, as well as the client framework, which allows the client to self-update |
| 1.PROXY | 1.Address of the proxy to use for this examination |

FIGURE 14

| 1.CLIENT ID | 1.A unique ID assigned to each client upon registration with the server |
|---|---|
| 1.NAME | 1.A plain text name for the client optionally supplied by the client software operator |
| 1.VERSION | 1.Version of the client software |
| ALGORITHM NAME | Name of the algorithm generating this specific report |
| ALGORITHM VERSION | Version of the algorithm generating this specific report |
| DETECTED ALGORITHM | Algorithm detected, if available |
| VALUE | Algorithm confidence value or other value associated with the detection |
| URL | URL of the detected media. USENET items are reported in a customized format with article number, date and time. |
| DATA | The suspect media file |

FIGURE 15

MEDIA ANALYSIS METHOD AND SYSTEM FOR LOCATING AND REPORTING THE PRESENCE OF STEGANOGRAPHIC ACTIVITY

This application is a continuation-in-part and claims the benefit of U.S. Non-Provisional Application Ser. No. 10/314,853, filed Dec. 9, 2002 under 35 U.S.C. § 120.

This application also claims the benefit of U.S. Provisional Application Ser. No. 60/684,838, filed May 26, 2005 under 35 U.S.C. §119(e).

FIELD OF THE INVENTION

The present invention relates to steganography detection and more particularly to the surreptitious detection, decoding and decryption of steganographic communications utilizing a distributed network computer systems.

DESCRIPTION OF THE RELATED ART

Steganography describes a broad class of techniques for communication via information that is hidden within plain view. The growth of interest and applications for steganography have both risen dramatically in recent years. As evidence by a "Google" search for the word "steganography," which returned approximately 69,600 hits and only six months later the same search returned approximately 243,000.

The essential idea of securing communications by hiding the communication itself has been in use since the time of the ancient Greeks. These techniques employ an innocuous cover medium to carry an embedded message. So long as some pretext exists for the presence for the cover medium, covert communication may take place. The message may be physically embedded in the cover medium using such techniques as film microdots or heat-activated inks. Alternatively, the message may be logically embedded using symbolic patterns in a drawing. The possibilities for this type of communication are limited only by the imagination and patience of those wishing to communicate.

U.S. patent application Ser. No. 10/828930, entitled, "Progressive Watermark Decoding On A Distributed Computing Platform," discloses a method of progressively decoding a digital watermark on a distributed computing platform. A client device equipped with a digital camera, such as a PDA or cell phone, captures a digital image of a watermarked object, and pre-filters the image to isolate a portion of the image data suspected of containing a digital watermark. The pre-filter de-correlates a portion of the image data suspected of containing a digital watermark from the remaining host image signal using a predictive filter. The client then quantizes the filtered data and progressively transmits the quantized data to a watermark decoder.

The progressive transmitter sends image data as necessary to achieve a valid decoding operation. To reduce bandwidth requirements, the transmitter starts with the most highly quantized version of the filtered image, and sends lesser quantized versions until the watermark decoder completes a successful decoding operation. While this disclosure may provide advantages, they are not without limitations. Chief among such limitations are the complexities associated with deriving new algorithms for steganographic detection and complexities and acceptance issues concerning various decryption approaches necessary to make the system of this referenced disclosure operate.

The purpose for steganography is to conceal the fact that a communication has taken place, in contrast to cryptography, which provides the means to ensure that the content of a communication is intelligible only to the intended recipient. In practical use, the content of a steganographic message is typically encoded as an extra precaution should the communication be detected. Steganography is just one component to secure communications operations with seeks to (a) conceal the content of the message; (b) conceal the meaning of the message; (c) avoid traffic analysis by concealing the connections between parties; and (d) maintain a covert channel by obscuring the existence of communication Codes and ciphers are used to conceal the meaning and content of the message, while steganography and other elements of operational discipline are used to conceal the communications channel and its endpoints. Any practical operations plan involves tradeoffs among these areas, which are tailored to the needs of the operation. For example, the use of ciphers requires the exchange of keys, which may be impractical or undesirable. Techniques such as a dead-drop help to prevent easy association between the sender and receiver, but may introduce other types of detection risks, as well as introducing communication delays.

The modern digital world offers new opportunities for hiding information within digital data, but the essential concept is unchanged from ancient times. Anyone wishing to communicate covertly via digital networks will be faced with the same limitations and trade-offs presented by traditional methods. Some pretext must exist for exchanging the cover medium, and some operational method must be developed to avoid creating an easily observed association between the two communicating parties.

The vast size and evolutionary nature of the Internet presents unique opportunities for creating a complex communications system with little time or money invested. However, these same technological developments also facilitate applying unprecedented amounts of computing power to the problem of detecting covert communications. Merely appearing ordinary to the unaided eye is not sufficient; to remain covert, communications must appear ordinary to the scrutiny of computer algorithms.

While there is some controversy as to whether steganography is being widely used by terrorist networks for communications, there is no doubt that the modern digital environment afforded by the internet and ubiquitous computing presents an opportunity that is well suited to the communications needs of a widely dispersed network organized on the cell principle.

While the prior art discloses tools to discover and decode steganographic messages the solutions do not encompass a network as large as the Internet. Furthermore, the prior art does not address and is deficient in providing a means to detect, decode and decrypt the transmissions without the entity that placed the message being aware of the discovery. It is well known in the intelligence community that while discovering the data is very important the fact that the placing party does not know of the discovery can be and often is equally as important.

What the prior art needs is a system and method to detect, decode and decrypt steganographic messages in an efficient and non-centralized manner while evading detection by the entity placing the encoded messages.

SUMMARY OF THE INVENTION

The present invention has been made in view of the above circumstances and has as an aspect a system and method for surreptitiously scanning a site for steganograhic communications.

A further aspect of the present invention is the scanning of a suspect site for steganographic communications utilizing distributed client servers.

A still further aspect of the present invention is the retrieving of suspected steganographic communications for analysis and notification of the detection to a third party.

An additional aspect of the present invention is the decoding and decryption of suspected steganographic communications.

Additional aspects and advantages of the invention will be set forth in part in the description which follows, and in part will be obvious from the description, or may be learned by practice of the invention. The aspects and advantages of the invention will be realized and attained by means of the elements and combinations particularly pointed out in the appended claims.

To achieve these and other advantages and in accordance with the purpose of the present invention, as embodied and broadly described, the present invention can be characterized according to one aspect the invention which comprises a method for detecting and analyzing sites suspected of transferring steganographic communications, the method comprising the steps of analyzing a targeted site for steganographic communications at the direction of a server, wherein the server directs a plurality of clients to analyze the targeted site. Directing a first client to analyze a portion of the targeted site based on parameters provided by the server and returning the results to the server. Dispatching a second client from the plurality of clients to analyze a portion of the targeted site based on the results of the first client and the parameters provided by the server and returning the results of the analysis to the server and repeating the dispatching step for each of the plurality of clients utilized in the analysis until the parameters for analyzing the targeted site have been satisfied. The results are aggregated from the plurality of clients and analyzed to determine if a steganographic communication is present.

The present invention can be characterized according to another aspect of the present invention as a method for detecting any analyzing sites for transference of steganographic encoded data, the method comprising means for detecting steganographic encoded data at a site and means for directing a pool of distributed processors to surreptitiously surveil a site by a central processing unit, wherein each processor in the pool of distributed processors is assigned an analysis task by the central processor based on objectives of the central processors and any data retrieved by previous processors comprising the processor pool that have analyzed a portion of the site.

The present invention can be further characterized according to an aspect of the of the invention as a software product on a computer readable medium capable of instructing a computer system to analyze a site for steganographic communications, to communicate with and direct a plurality of client servers to aide in analyzing the site and to communicate to one of the plurality of client servers to analyze a portion of the site and return results of the analysis to a central server, wherein the dispatched client server analyzes the site based on parameters provided by the central server. An instruction set dispatches subsequent client servers from the plurality of remaining client severs to analyze unanalyzed segments of the targeted site based on the results of previous client servers that have been dispatched to analyze the site and operational parameters of the central server, wherein the instruction set is repeated until the central server operational parameters are met and instructed set to aggregate the results from the plurality of client servers and analyze the results to determine if steganographic encoded data is present It is to be understood that both the foregoing general description and the following detailed description are exemplary and explanatory only are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 14 depicts a table detailing server/client message exchanges of an aspect of the present invention; and FIG. 15 depicts a table detailing client/server message exchanges of an aspect of the present invention.

DETAILED DESCRIPTION

The detailed description is divided into two sections. In the first section, a distributed network for monitoring steganographic communications is described in detail. In the second section, a system and method for analyzing targeted sites is described in detail.

Distribute Network Monitoring

The growth of interconnected networks provides an increased amount of network traffic. In addition, the growth of the Internet has connected more computational devices of various types to a universally accessible network structure. With the rise of terrorism, more interest has been expressed in monitoring network traffic for hidden messages or steganographically-encoded data.

Figure 1:
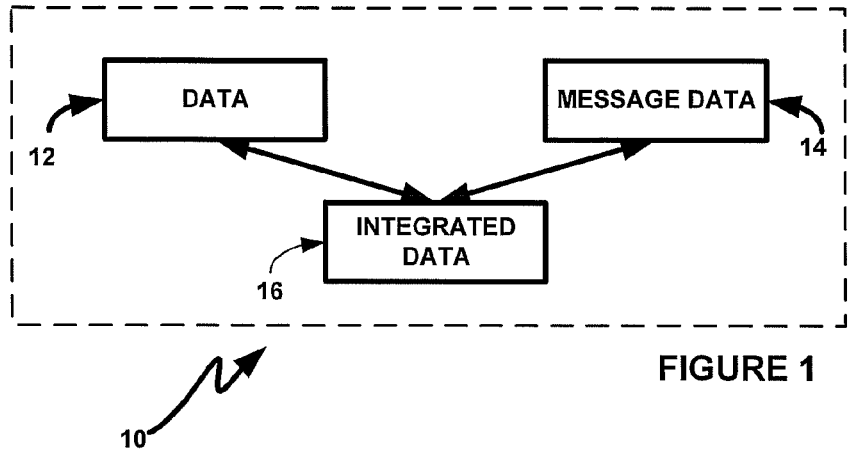
FIG. 1 is a schematic block diagram depicting the encoding and decoding of steganographic messages.

FIG. 1 depicts the encoding and decoding 10 of data. Seemingly unimportant or innocuous data 12 may be combined with hidden message data 14 into an integrated data 16. The integrated data may carry with it many of the aesthetic aspects of data 12. However, with the correct key or method of decoding, the data 12 and the message data 14 may be recovered. If the exact method or key is not known, the integrated data 16 may still carry with it indications that a steganographic method or hidden message 14 is present.

Various steganographic programs and methods have been developed. For digital image and other data, various programs may be used to steganographically encode or decode data including Blindside, BMP Secrets, BMPEmbed, BMPTable, Camouflage 2.0, Contraband, Courier v1.0, Covert-TCP, Data Stash v1.1, DC-Stego, Diskhide, Dmagic v6.0, EIKONAmark, FFEncode, Giovanni (Bluespike),Hide4PGP, Invisible Encryption, Invisible Secrets Pro, MP3Stego, S-Tools, Snowdisk, Steganos, StegComm, SysCop, and White Noise Storm, among others. However, various programs, interfaces, and steganographic methods may be employed.

The integrated data 16 may carry with it indications that a steganographic message 14 is hidden within the data 16. In some cases, histograms, excessive noise, color palettes, and other parameters associated with image data may indicate the possibility presence of an encrypted message. However, in many cases, the exact encoding method must be known or many methods tested against the data.

As such, detection of steganographic messages in network traffic and distributed about a large public network may benefit from a large amount of computation cycles and network access points. Limitations on the available resources to law enforcement officials prevent widespread monitoring of network traffic and network locations.

If the available cycles of various computers are used over a network and those computational devices are located in differing regions of the network, more network traffic and locations may be observed and tested. A distributed system of computers such as those in the homes of individuals may be used to provide the large amount of computational cycles and monitor various regions of the network.

Figure 2:
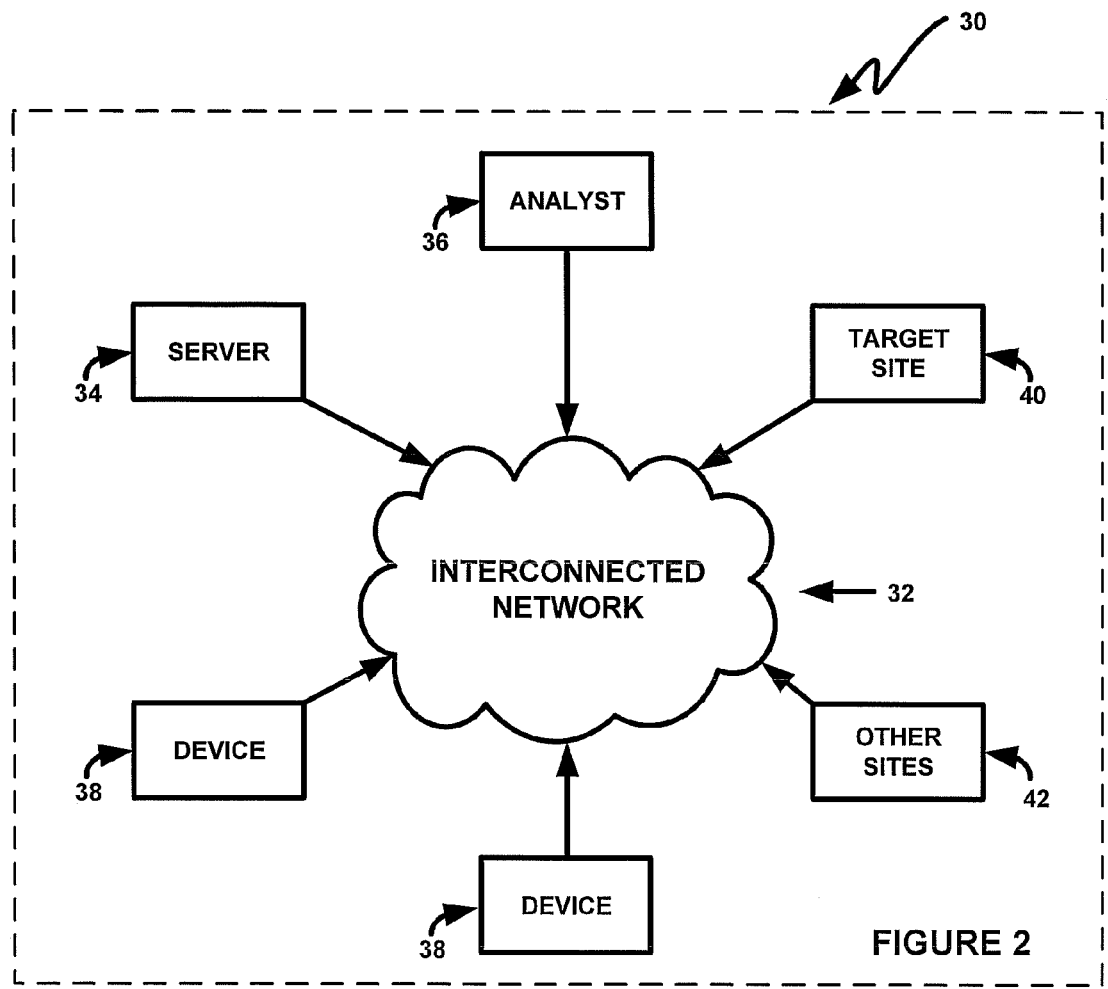
FIG. 2 is a schematic block diagram depicting a system, according to and embodiment of the present invention.

FIG. 2 depicts an exemplary system 30 for monitoring network traffic and locations. Devices 38 may through the interconnected network 32 communicate with a server 34. The server may have programming instructions and parameters associated with target sites 40 and other sites 42. The programming instructions may be provided to the device 38 through the interconnected network 32. Then, the device 38 may interact with a target site 40 or other sites 42 to retrieve data. The data may be tested for the presence of hidden messages. If a hidden message or suspect data is found, the data or an alert regarding the location of the data may be sent from the device 38 through the interconnected network 32 to the server 34.

The analyst device 36 may communicate with the server 34 through the interconnected network 32. The analyst device 36 may request information regarding alerts and suspect data from the server 34. Alternately, the server 34 may send a message to the analyst device 36. Through the analyst device 36, an analyst may monitor the network 32.

The interconnected network 32 may take various forms and communicate using various protocols. These forms may include combinations of wireless networks, hard-wired networks, local area networks, wide area networks, global networks, among others. The networks may use protocols such as TCP/IP, and application layer protocols such as FTP, HTTP, and SMTP, among others. However, various networks and network protocols may be used in conjunction with the invention.

The computational devices 38 may take various forms. These forms may include desktop computers, notebook computers, handheld circuitries, smart phones, and other devices connected to the network and having available computational cycles. For example, a desktop computer may be connected to a network. The desktop computer may retrieve programming instructions and parameters from the server 34. These programming instructions and parameters may direct the computational device 38 to retrieve data from a specific target site 40 or other sites 42. The computational device 38 may then test the data for indications of hidden messages. Upon finding indications of hidden messages, the computational device 38 may alert analyst device 36. This may be performed by sending a message to the server 34 that subsequently is sent to or retrieved by the analyst device 36. However, the computational device 38 may alternately communicate directly with the analyst device 36.

The server 34 may take various forms. These forms may include servers coupled to an interconnected network 32 and running operating systems such as UNIX, LINUX, Windows NT, Windows 2000, a Mac OS, or various other operating systems, among others. The server may include instructions for accessing target sites, communicating with target sites, retrieving data from target sites, testing the data, and alerting or communicating with the server 34.

In addition, the server may determine or store parameters associated with the location of target sites or a range of sites of interest. The server may also include parameters associated with testing methods and indicator thresholds. Further, the server may include parameters associated with the identity of an analyst or analyst device responsible for monitoring any given type of alert or alerts in general. For example, the server may send an email to an analyst device upon notification of suspect data. Alternately, the server may document the suspect data in a database accessible by the analyst device.

In one exemplary embodiment, the computational device 38 may be a laptop or desktop device having extra computational cycles such as computers in businesses, homes, and government facilities. The computational device 38 downloads interpretable instructions from the server 34. For example, the computational device 38 may use a web browser to interact with the server 34 and download a JAVA code. The server 34 may also provide parameters associated with a target site location or a range of other sites that may be searched. The JAVA code is interpreted by the device 38 to search the indicated sites for data, test the data for indications of hidden messages, and alert the server 34 of suspect data. This alert may be a posting or transfer of data to the server through FTP, HTTP, or other protocols. Alternately, the device 38 may send an email to the server 34 indicating the data or suspect data.

The analyst device 36 may be a desktop or laptop computer, which accesses the server to retrieve messages associated with suspect data. Alternately, the server 34 may send an email to the analyst device 36 notifying an analyst of suspect data. The email may or may not include the data or the location of the data.

Figure 3:
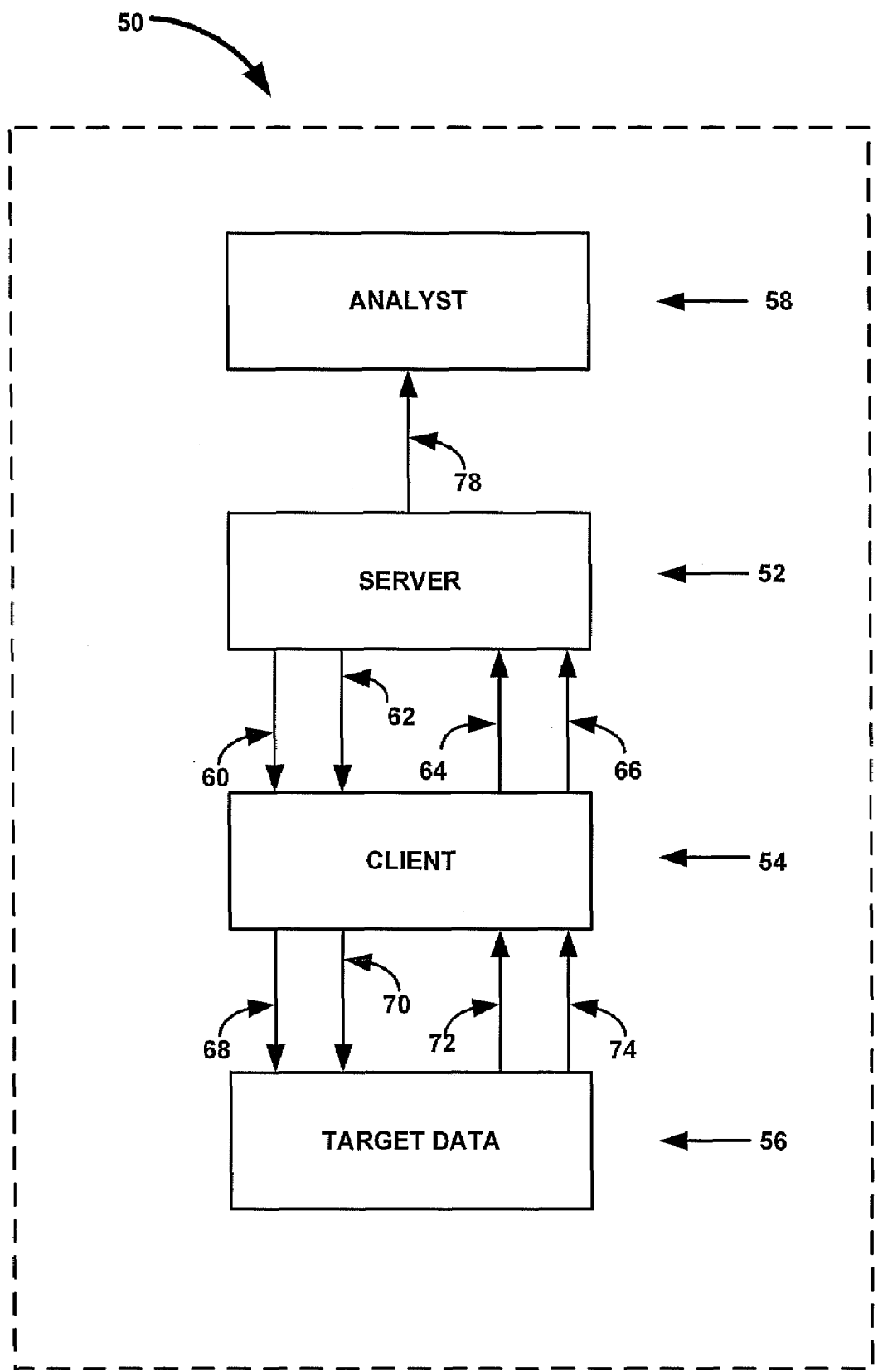
FIG. 3 is a schematic block diagram depicting exemplary communication paths of the system as depicted in FIG. 2.

FIG. 3 is a schematic diagram depicting various communications between the components of the system. The server 52 may provide to the client 54 a communication 60 that includes a set of URL targets to be searched. Alternately, the server may distribute in a communication 62 a set of random IP address targets or a range of targets to be searched by the client 54. The client 54 may communicate with the target 56 with a message 68 which request website HTTP access.

The client 54 may then scan for images and retrieve those images with a message 70. The target site 56 may provide a message indicating access to the client 72 and the requested images 74. The client 54 may then analyze the image data for hidden messages. If the data has a hidden message or has parameters indicative of the hidden message, the client 54 may communicate with a message 64 to a server 52 to indicate the presence of suspect data. The server 52 may then communicate in a message 78 to an analyst device 58 the presence of suspect data. If the client 54 exhausts sites in a search for data, the client 54 may request in a message 66 additional URL locations or a range of possible websites to search.

However, various other protocols may be used. In addition to HTTP, methods such as FTP and SNMP may be used to retrieve data, among others. Data such as sound data, image data, movie data, other compressed data, and text files, among others, may carry hidden messages and be tested by the client 54. Communications between the client 54, the server 52 and the analyst 58 may take various forms, including TCP/IP, SNMP, FTP, HTTP, and SMTP, among others.

In an exemplary embodiment, a server may distribute to a larger number of client devices programming instructions for testing data at various locations. The server may act to manage the locations that are tested and the alerts or messages associated with suspect data. In this manner, a large number of computational devices distributed about a public network may provide spare computational cycles to a centralized or set of centralized servers seeking to monitor a large amount of network traffic and locations.

Figure 4:
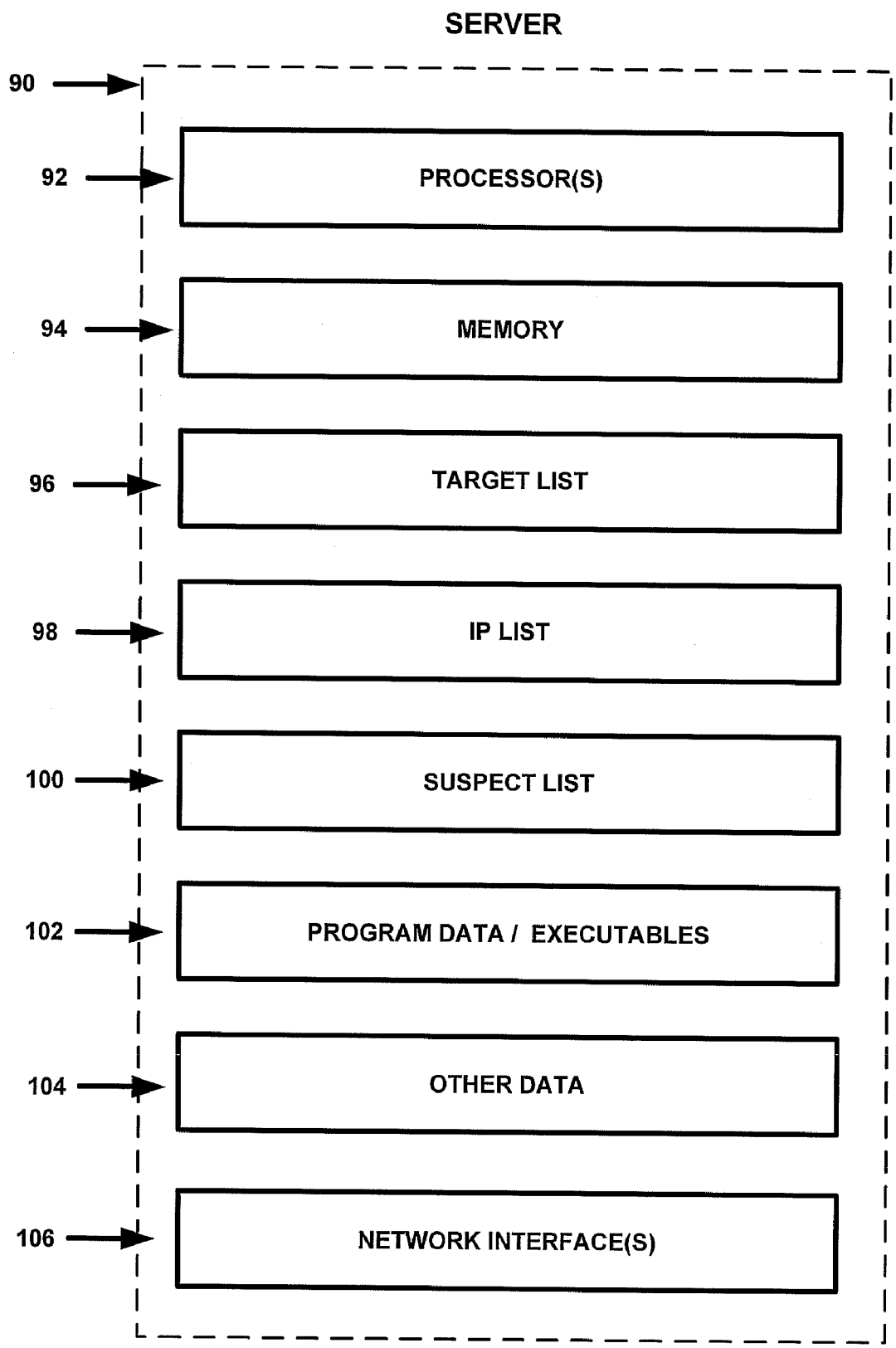
FIG. 4 is a block diagram depicting an exemplary embodiment of a server, as depicted in FIG. 2.

FIG. 4 is a block diagram depicting an exemplary server for use by the network as seen in FIG. 2. The server 90 includes a processor 92, memory 94, target list 96, IP list 98, suspect list 100, executable files 102, other data 104 and one or more network interfaces 106. However, each of these elements may or may not be included together, separate or in various combinations, among others.

Processor 92 and memory 94 may take various forms and interact to enable the delivery of information through the network interfaces 106 to analyst devices and computational devices. The processor or processors 92 may take various forms of computational circuitries. The memory 94 may include RAM, ROM, CD ROMs, DVDS, removable hard drives, hard drives, floppy drives and other storage mediums.

The server may also include a list of targets 96 and/or an IP address list 98. These lists may be used to distribute location data to client devices. These client devices then search the target or range of targets provided to find steganographically-hidden messages. Once the suspect data is determined, the client device may provide information associated with the suspect data to the server, which may be stored as part of a suspect list 100.

The server 90 may also hold programmable data and executables 102. This data may comprise interpretable instruction files, executables, installation packages, testing method instructions, decoding instructions, and other programming instructions provided to client computational devices for use in seeking and testing network locations.

The server may also include various other data 104 and executables 102. The server may include operating systems, network interface instructions, communications protocols, among others. The other data 104 may include data associated with analysts, testing method threshold parameters, and original data files for comparison with suspect files.

Figure 5:
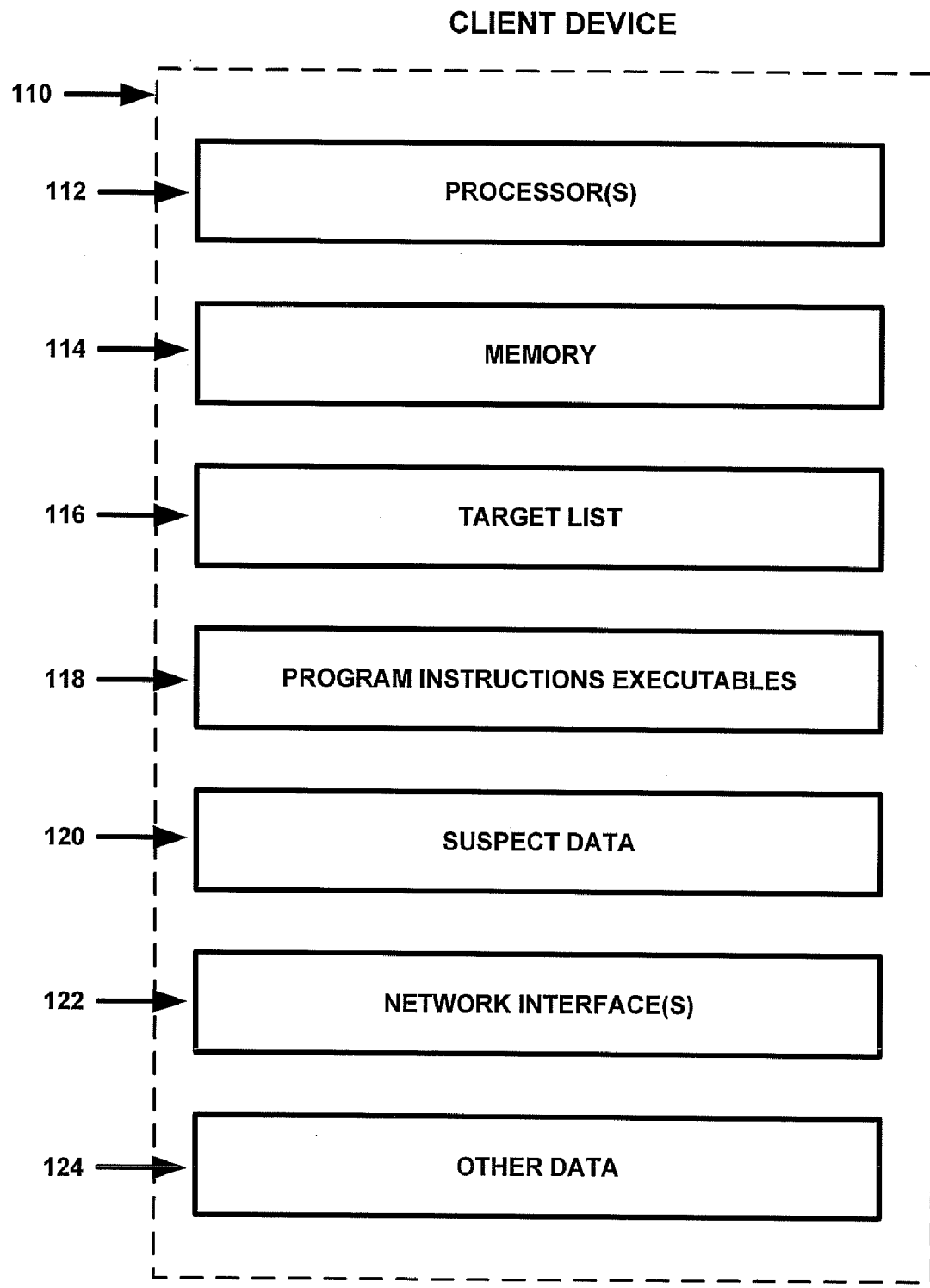
FIG. 5 is a block diagram depicting an exemplary embodiment of a client machine or device as depicted in FIG. 2.

FIG. 5 is a block flow diagram depicting a client device 110. The client device 110 may include one or more processors 112, memory 114, IP/target data 116, executables 118, suspect data 120, network interfaces 122 and other data 124, among others. These elements may or may not be included together, separate or in various combinations, among others.

The processors 112 and the memory 114 may take various forms. The processor or processors 112 may take various forms of computational circuitries. The memory 114 may include RAM, ROM, CD ROMS, DVDS, removable hard drives, hard drives, floppy drives and other storage mediums.

The IP/target data 116 may be a list or range of addresses or locations located on the network for which the client device is responsible for searching. For example, this may include a list of IP addresses or domain names.

The client device 110 may also include various executables 118 including operating systems, browsers and instructions for accessing the network interface. The executables and program instructions 118 may include software downloaded from the server containing instructions for searching locations on the network associated with the IP/target data 116, testing data located at those locations, and alerting or notifying the server of the presence of that data.

The client device may also include data downloaded from the target sites 120. The data is tested in accordance with the program instructions 118 to determine whether hidden messages exist or are indicated in the data. The client device may then store that data 120, forward to the server, or notify the server of the location of that data. The client device may also include other data 124 that takes the form of data for comparison with suspect data, testing parameters, and threshold values, among others.

Further, the client device may have one or more network interfaces 122 which permit and enable communication with the network through various protocols including HTTP, FTP, SMTP, TCP/IP, and SNMP, among others.

The server 90 of FIG. 4 and the client device 110 of FIG. 5 may work in conjunction to monitor network traffic and locations for suspicious data. The server may direct one or more computational devices to seek and test data associated with a specific IP address, domain name, newsgroup, chat room, message board, or website, among others; observe a specific data for change; or seek and test data in a address range; among others.

For example, the server may direct a computational device to test messages on a specific message board for hidden messages found with a specific steganographic technique. In another example, the server may direct a computational device to observe a specific image data on a website and compare it with previous copies of the image data, testing the data for a change that would indicate the presence of a hidden message. Further examples include monitoring image postings in a newsgroup for suspicious images, seeking data in a range of IP addresses for data that appears suspicious given a specific testing technique, and downloading and testing data from a subscriber site for testing with a specified test, among others. However, various uses of the system may be envisioned.

Figure 6:
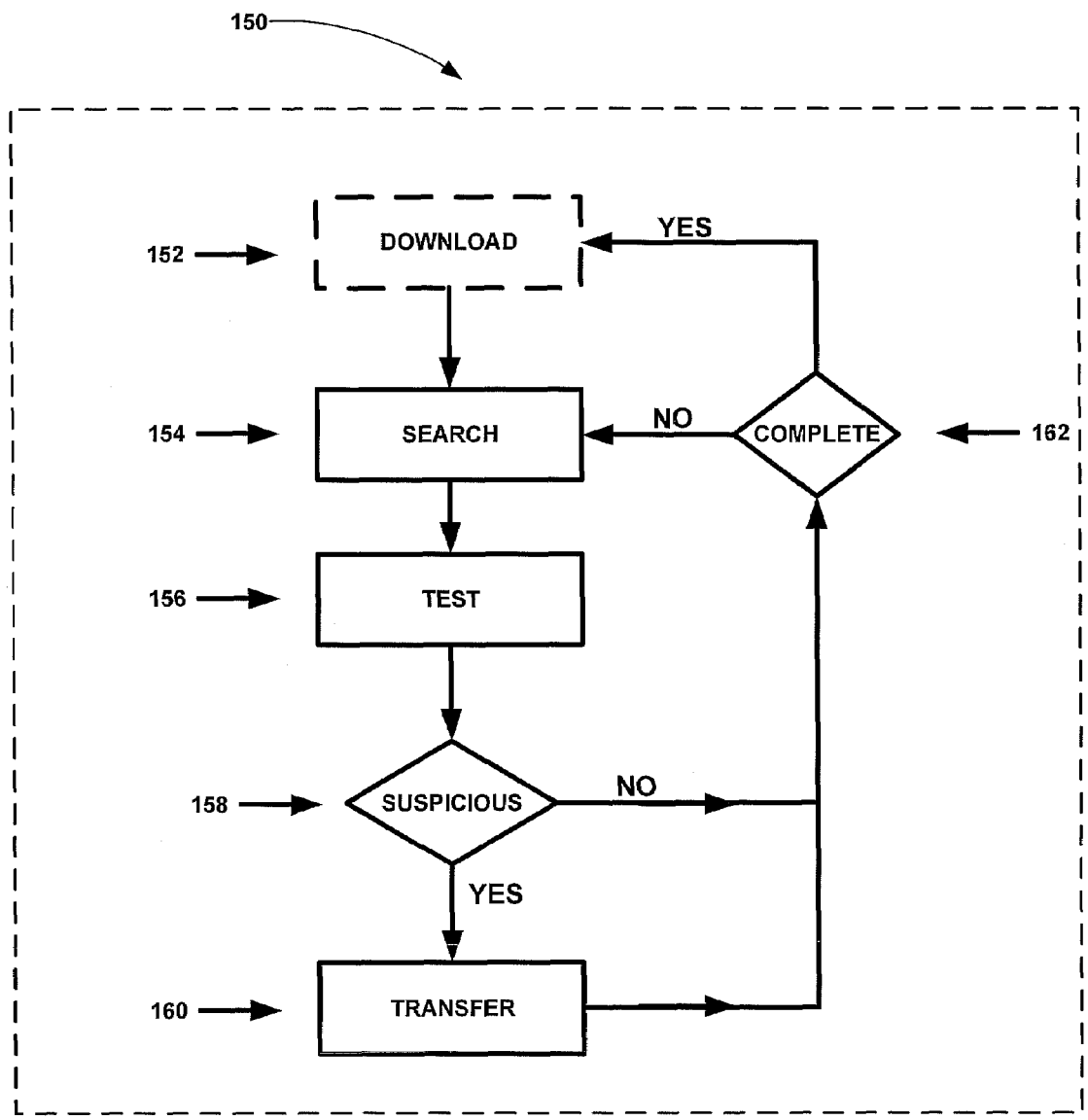
FIG. 6 is a block flow diagram of an exemplary method for use by the system as depicted in FIG. 2.

FIG. 6 depicts an exemplary method for monitoring a network for steganographic data. The method 150 includes searching the network, testing found data, and transferring alert messages to an analyst. Data, programs, and instructions may be downloaded to the client device as seen in a block 152. This data may provide the client device with the parameters of the search, information about the testing techniques, and information associated with alerting the analyst, among others.

As seen in a block 154, the client device may then seek and test suspect data in accordance with the instructions. This search may yield data that is then tested as seen in a block 156. The client device may test the data for indicators of hidden messages. The client device may use various testing, decode, and decrypting techniques, among others. The testing may also include comparing data with clean data; comparing parameters associated with the data with threshold values; and evaluating tables associated with the data, among others.

If the data is suspicious or possibly contains a hidden data or message, an alert may be forwarded to a server or analyst as seen in a box 160. This alert may include the data, information about the data, or the location of the data, among others. The alert may be an HTTP, FTP, or SMTP message. However, the alert may take various forms. The server may forward the information to an analyst or store the alert in a data file.

Once the data is tested, the client device may continue with the search over a given set of locations or may seek a new set. Alternately, the client may seek a new set of instructions, data, or programs, among others.

A System And Method For Analyzing Targeted Sites

An aspect of the present invention exploits the beneficial use of the immediate access to worldwide point-to-point communications combined with speed and comparative anonymity afforded by simple Internet tools. Within moments, information posted from a public access point can be seen anywhere in the world-if the recipient knows where to look-without creating the conspicuous association provided by a phone call, or requiring a complex chain of trusted associates.

While there are many possible variations in the aforementioned system, they would most likely all share the common characteristic of a publicly accessible dead-drop location, the equivalent in the digital world of the public locker. This is the hook that makes the detection of such steganographic schemes possible, as will be described below.

Basic military tactics dictate that the enemy must not be given a free arena for information operations. Information dominance is battled for, like air superiority. Information dominance increases military capabilities by using that information to make right decisions, and apply them faster than the enemy can. Information dominance provides a way to alter the enemy's entire perception of reality and to use all available information to predict (and affect) what happens tomorrow before the enemy acts.

The Internet today represents an unfettered communications channel that America's enemies can use for worldwide secure covert communications. Prudent information warfare demands that restricting enemy use of this communications network. It may not be practical to deny them the channel entirely, but it is possible to exert enough surveillance pressure to force them to use strict communications discipline.

The following sections present an overview of the rationale behind system design choices, an overview of the present invention, and provides details for various functional areas, as well as the background for many of the operational factors.

A first aspect of the present invention includes a means for detecting covert communications. Detection is accomplished via a variety of methods that fall into two main categories. The first are technical means of detection that rely on analysis of the cover medium to reveal statistical variations or signatures indicating that it may be the product of a steganographic encoding process. The second includes contextual monitoring techniques focused on the cover medium's context and designed to review unusual patterns in media management. These methods are complimentary and ideally are used together to refine the detection process.

While it is not possible to detect every conceivable type of steganographic technique, it is imminently practical to examine the currently available steganographic tools to ensure a high probability of detection with the most likely methods. In order to ensure comprehensive coverage and effectiveness, the operational system is preferably kept up to date with the latest commercial and public domain steganography tools. A library of all known tools (multiple versions, where applicable) should be maintained to form the basis for a system test suite. These programs and their output should be the subject of forensic investigation to determine the most appropriate countermeasures for each one.

A further aspect of the present invention determines where and how to monitor for covert communications. A guiding principle in detection design is to exploit the drop-box. Web sites constitute the most common publicly accessible for of drop box, but there are others. The system preferably includes the ability to collect information using the various Internet communications protocols, including, for example, (a) Web sites, including free sites, photo sharing sites, and other open exchanges; (b) Usenet news groups; and (c) FTP sites While USENET news groups are simply linear catalogs of postings, web sites may have a complex evolving structure. The changes in media and site structure over time may provide the contextual clues to possible use of media for covert communications. The system should have the ability to monitor a web site as a complete logical entity, with the ability to denote such events as the update of a media file without changing the name, removal of media files only, and removal of entire branches of site structure.

The size of the Internet combined with the magnitude of the steganographic analysis processing presents a bandwidth and processing challenge. This issue arises in many domains in that what is trivial to accomplish on a small scale can become nearly impossible to perform on a large scale in a timely manner. A distributed processing model addresses this issue by dividing the processing work and bandwidth demands among many processors. A central server dividing the work among many clients can distribute both he processing and bandwidth demands. At odds with this approach are the possible analysis benefits that could be derived from logging and reporting as much information as possible about the client's processing activities and results. As the clients report more information about the images searched and their analysis results, more demands are placed on the server in terms of bandwidth and processing power.

Distributed solutions rely on the fact that some problems can be broken into discrete parts in which the value of being able to put more "hands" to work outweighs the overhead associated with dividing the work into self-contained tasks and aggregating the results, such as is done with the SETI project. This fundamental applies to manual labor or manufacturing supply chains as well as computation. The way work is divided and result aggregated has everything to do with overall efficiency, and the optimal structure is not necessarily obvious.

Distributed approaches for gathering data from the internet all have a common point of difficulty, being that the data must eventually be aggregated somewhere for analysis, and that collection point is where the system becomes both expensive and technically complex to scale up. This problem is compounded by the conflict between the potential analysis benefits that could be derived from collecting and aggregating as much information as possible about every data item versus the need to minimize the demands on the central server. As the clients report more information, more demands are placed on the server in terms of bandwidth and processing power.

There is a simple but unavoidable trade-off in distribution; the more results remain distributed, the more complex reporting and analysis becomes. The more aggressively data is aggregated, the easier reporting and analysis becomes, but at the expense of adding demands for communications and computing power to accomplish the aggregation itself.

Consequently, the system strikes a balance between information completeness and processing requirements. A primary consideration in looking for images used for steganographic communication is to avoid making the search obvious to the party being watched. While this is not an issue for USENET news, or public web sites where the users do not have access to site usage statistics, it is a factor in cases where the party using the site for communications has access to web visitor logs.

There are two primary ways in which the user might be "tipped off" to observation. First is by characteristics associated with the visitor, such as a telltale domain name (a .mil or .gov address), or by regular traversals of the entire site by the same visitor. Such activities would be even more conspicuous on a low-traffic site.

It is possible to hide the identity of a web browser from the server by using proxies that use layers of encryption to hide the source and destination of packets, and there are services that freely provide such anonymous browsing capability. Using such a service does hide the identity of the browser, but it does not hide the fact that the browser wishes to be anonymous, since the browser appears to the web server as a connection from an anonymizer.

The disclosed system incorporates a two-fold solution to this issue. First of all, scanning occurs from a nondescript location, ideally an IP address within a cable modem subscriber pool. This provides a measure of anonymity without calling attention to the fact that one is trying to access the site anonymously. Secondly, the disclosed system performs searching by a pool of distributed clients. This assures that the site is not repeatedly accessed from the same location.

Additional benefits could be gained by dividing the work of searching a site among several clients so no single client browses an entire site by itself. The rapid traversal for a web site by a single client is a give-away of a site scanning or downloading program. Some webmasters ban IP addresses which frequently exhibit this behavior simply because they do not want their sites to be downloaded.

The system obviously ignores the rules provided by the site for web indexing spiders. While these rules serve a legitimate purpose in guiding the indexing efforts for sites like Google and Lycos away from content that site owners do not want indexed, they clearly cannot be allowed to limit the search for steganographic media. This activity preferably is undertaken carefully so as not to constitute an altering behavior. Webmasters are legitimately sensitive to any activity which appears to be automated searching out of the bounds proscribed for spiders, since this is the hallmark of such activity as search web sites for email addresses to generate spam lists.

The present invention monitors images on a recurring basis to determine when or if they change, which gives rise to the necessity to schedule this recurring activity. The need to control scanning arises from the need to balance the potentially revealing consequences of repeated scanning against the value of gleaning more data about a site and its images over time Some demands for scheduling arise from the fact that it is desirable to divide the work of scanning a candidate site among many clients to conceal the scanning operation itself. In this case, the operator does not care which particular clients carry out the scanning operation, only that it is conducted. This parceling out of scanning at this level should be performed by an automated subsystem.

Once a potential steganographic communication has been identified, the next step is to attempt to reveal the message content. The details of this process vary according to the nature of the cover medium, but the essential idea is the extract the content from the cover medium by reversing the particular method used to hide the data.

In cases where the encoding program can be identified, the most direct approach is to simply use the original program to reverse the encoding process. Some programs add password protection schemes to make decoding less straightforward.

There are a number of published techniques for reversing steganographic algorithms and breaking password protected steganographic files. Some of these techniques depend on weaknesses in the algorithms that leave telltale clues as to the specific algorithm used to generate the file, or weak methods for concealing the password within the media file. Others rely on brute force techniques.

When the hidden message content has been revealed, it is likely to be encrypted. This may be the result of an encryption process performed automatically by the software used to generate the message, or it might be the result of a manual encryption process performed before hiding the message.

Figure 7:
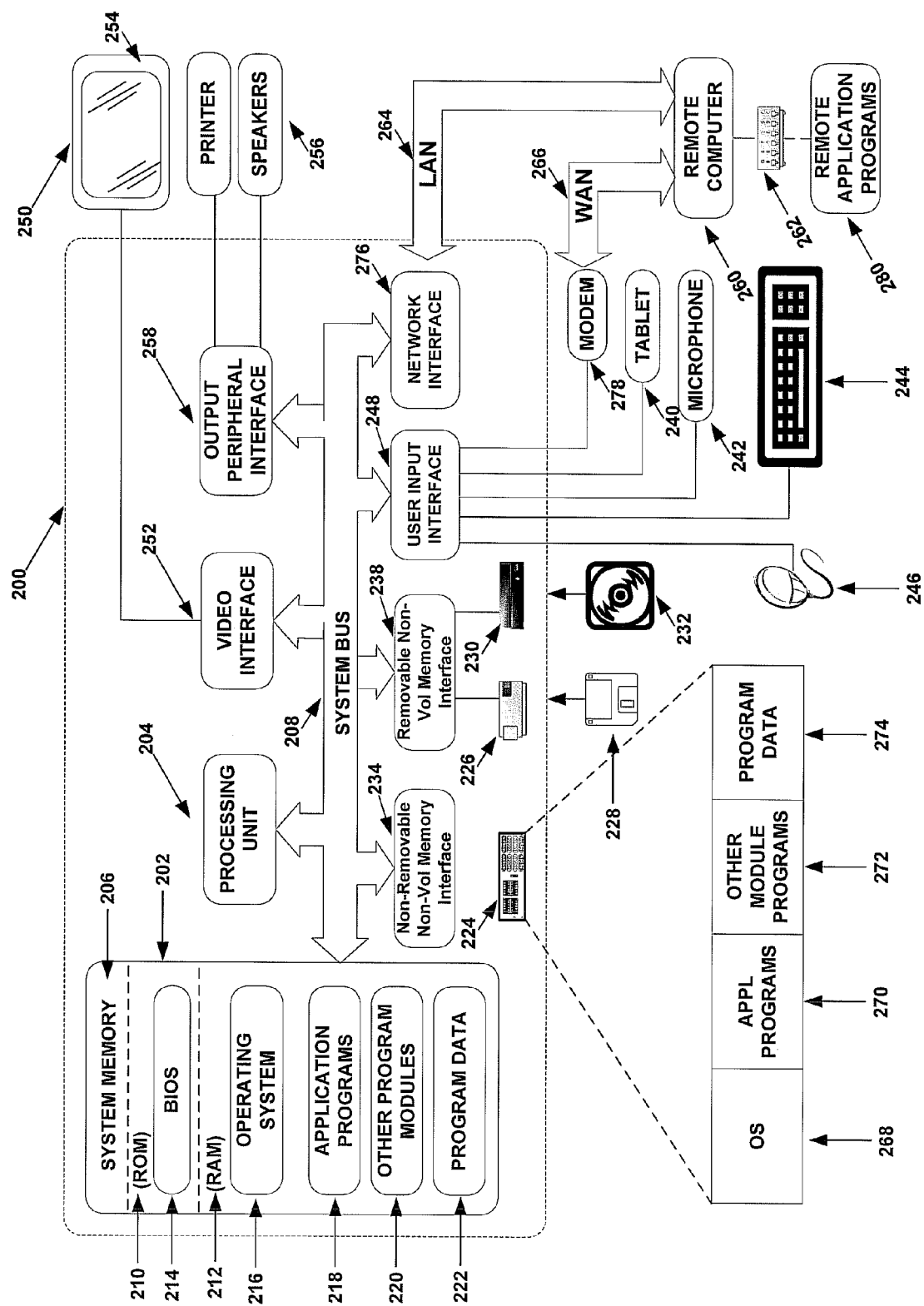
FIG. 7 depicts a schematic diagram of a general purpose computer.

FIG. 7 is a block diagram of the hardware and operating environment 200 in which different embodiments of the present invention can be practiced. FIG. 7 provides an overview of computer hardware and a suitable computing environment in conjunction with which one or more embodiments of the present invention can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

In FIG. 7, the computing system 200 is only one example of a suitable computing environment and is not intended to suggest any limitation as to the scope of use or functionality of the invention. Neither should the computing system 200 be interpreted as having any dependency or requirement relating to any one or combination of components illustrated in the exemplary operating computing system 200.

With reference to FIG. 7, an exemplary system within a computing environment for implementing the invention includes a general purpose computing device in the form of a computing system 200, commercially available from Intel, IBM, AMD, Motorola, Cyrix and others. Components of the computing system 202 may include, but are not limited to, a processing unit 204, a system memory 206, and a system bus 236 that couples various system components including the system memory to the processing unit 204. The system bus 236 may be any of several types of bus structures including a memory bus or memory controller, a peripheral bus, and a local bus using any of a variety of bus architectures.

Computing system 200 typically includes a variety of computer readable media. Computer readable media can be any available media that can be accessed by the computing system 200 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing system 200.

The system memory 206 includes computer storage media in the form of volatile and/or nonvolatile memory such as read only memory (ROM) 210 and random access memory (RAM) 212. A basic input/output system 214 (BIOS), containing the basic routines that help to transfer information between elements within computing system 200, such as during start-up, is typically stored in ROM 210. RAM 212 typically contains data and/or program modules that are immediately accessible to and/or presently being operated on by processing unit 204. By way of example, and not limitation, FIG. 7 illustrates operating system 216, application programs 220, other program modules 220 and program data 222.

Computing system 200 may also include other removable/non-removable, volatile/nonvolatile computer storage media. By way of example only, FIG. 7 illustrates a hard disk drive 224 that reads from or writes to non-removable, nonvolatile magnetic media, a magnetic disk drive 226 that reads from or writes to a removable, nonvolatile magnetic disk 228, and an optical disk drive 230 that reads from or writes to a removable, nonvolatile optical disk 232 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 224 is typically connected to the system bus 236 through a non-removable memory interface such as interface 234, and magnetic disk drive 226 and optical disk drive 230 are typically connected to the system bus 236 by a removable memory interface, such as interface 238.

The drives and their associated computer storage media, discussed above and illustrated in FIG. 7, provide storage of computer readable instructions, data structures, program modules and other data for the computing system 200. In FIG. 7, for example, hard disk drive 224 is illustrated as storing operating system 268, application programs 270, other program modules 272 and program data 274. Note that these components can either be the same as or different from operating system 216, application programs 220, other program modules 220, and program data 222. Operating system 268, application programs 270, other program modules 272, and program data 274 are given different numbers hereto illustrates that, at a minimum, they are different copies.

A user may enter commands and information into the computing system 200 through input devices such as a tablet, or electronic digitizer, 240, a microphone 242, a keyboard 244, and pointing device 246, commonly referred to as a mouse, trackball, or touch pad. These and other input devices are often connected to the processing unit 204 through a user input interface 248 that is coupled to the system bus 208, but may be connected by other interface and bus structures, such as a parallel port, game port or a universal serial bus (USB).

A monitor 250 or other type of display device is also connected to the system bus 208 via an interface, such as a video interface 252. The monitor 250 may also be integrated with a touch-screen panel or the like. Note that the monitor and/or touch screen panel can be physically coupled to a housing in which the computing system 200 is incorporated, such as in a tablet-type personal computer. In addition, computers such as the computing system 200 may also include other peripheral output devices such as speakers 254 and printer 256, which may be connected through an output peripheral interface 258 or the like.

Computing system 200 may operate in a networked environment using logical connections to one or more remote computers, such as a remote computing system 260. The remote computing system 260 may be a personal computer, a server, a router, a network PC, a peer device or other common network node, and typically includes many or all of the elements described above relative to the computing system 200, although only a memory storage device 262 has been illustrated in FIG. 7. The logical connections depicted in FIG. 7 include a local area network (LAN) 264 connecting through network interface 276 and a wide area network (WAN) 266 connecting via modem 278, but may also include other networks. Such networking environments are commonplace in offices, enterprise-wide computer networks, intranets and the Internet. For example, in the present embodiment, the computer system 200 may comprise the source machine from which data is being migrated, and the remote computing system 260 may comprise the destination machine. Note however that source and destination machines need not be connected by a network or any other means, but instead, data may be migrated via any media capable of being written by the source platform and read by the destination platform or platforms.

The central processor operating pursuant to operating system software such as IBM OS/2®, Linux®, UNIX®, Microsoft Windows®, Apple Mac OSX® and other commercially available operating systems provides functionality for the services provided by the present invention. The operating system or systems may reside at a central location or distributed locations (i.e. mirrored or stand-alone).

Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two. Furthermore, software operations may be executed, in part or wholly, by one or more servers or a client's system, via hardware, software module or any combination of the two.

A software module (program or executable) may reside in RAM memory, flash memory, ROM memory, EPROM memory, EEPROM memory, registers, hard disk, a removable disk, a CD-ROM, DVD, optical disk or any other form of storage medium known in the art. An exemplary storage medium is coupled to the processor such that the processor can read information from, and write information to, the storage medium. In the alternative, the storage medium may be integral to the processor. The processor and the storage medium may also reside in an ASIC.

The bus may be an optical or convention bus operating pursuant to various protocols that are well known in the art.

Figure 8:
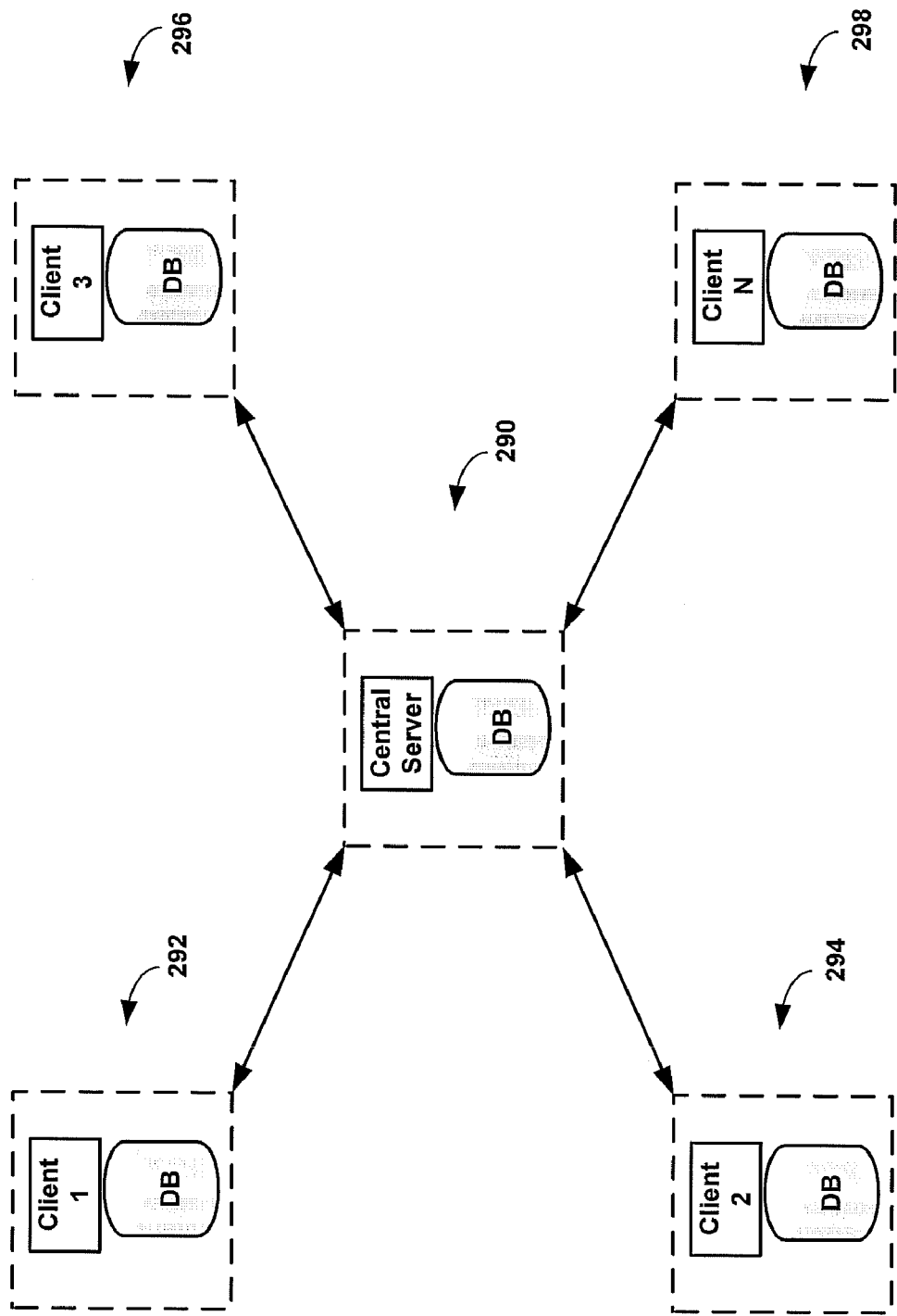
FIG. 8 depicts a distributed server/client network of an embodiment of the present invention.

FIG. 8 depicts a diagram of a distributed network with server 290 and clients 292, 294, 296 and 298.

Figure 9:
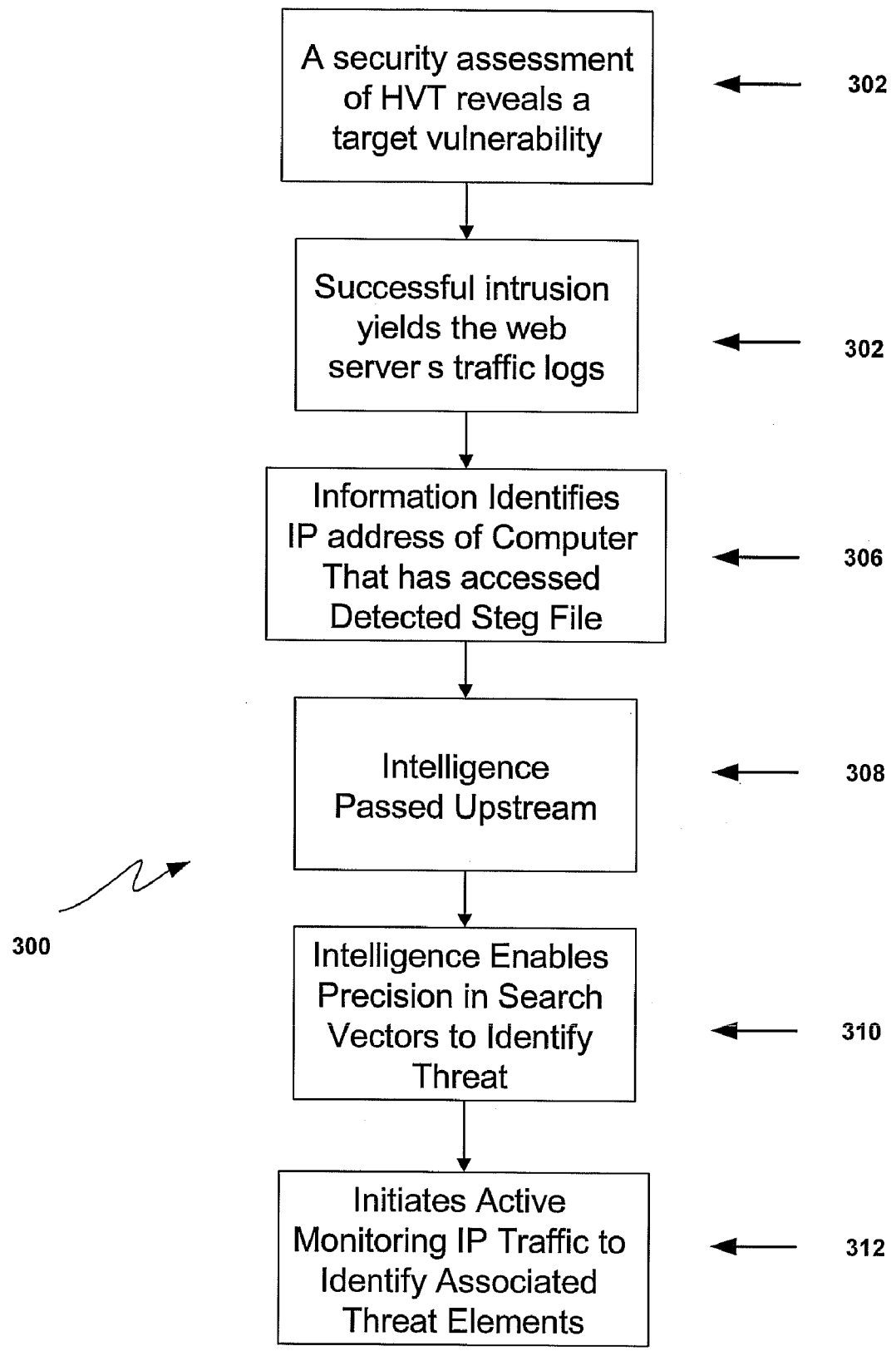
FIG. 9 depicts a flow chart of general process of an aspect of the present invention.

FIG. 9 depicts a high level flow diagram 300 of an aspect of the present invention. At step 302 a security assessment of a high volume traffic site reveals itself as a target vulnerability. At step 304 a successful intrusion of the site provides intelligence regarding the server's traffic logs. At step 306 information gleamed at step 304 is used to identify the IP address of a computer or processor that has accessed the identified steganographic file.

The intelligence is passed to the appropriate local, state or federal channels at step 308. At step 310, the gathered intelligence enables the implementation of precision search vectors to identify and quantify the nature of the threat. At step 312, monitoring of IP traffic is initiated to quantify the threat, those involved with the threat and equipment employed to carry out the threat.

Figure 10:
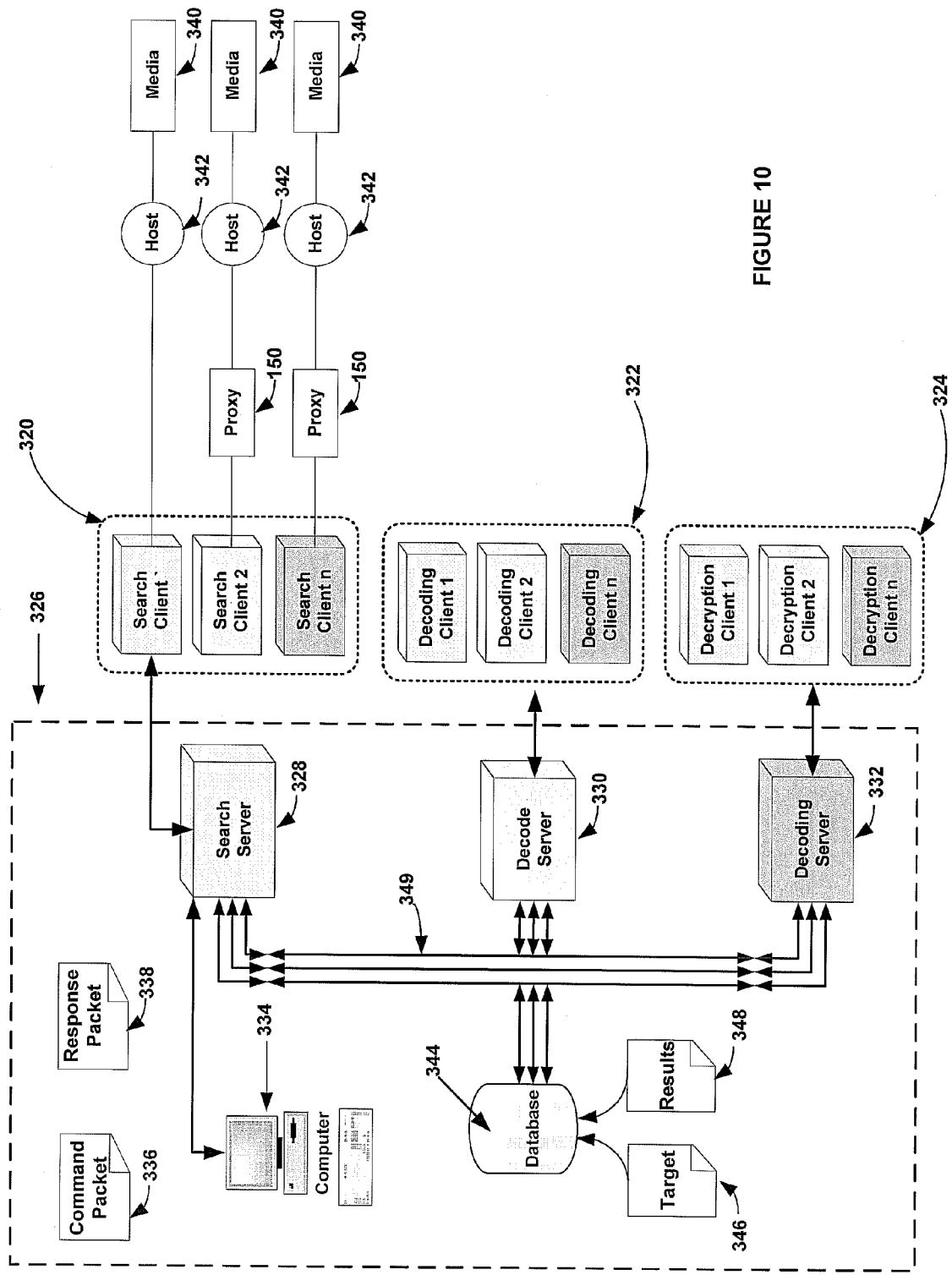
FIG. 10 depicts a flow diagram of the client/server relationship of an embodiment of the present invention.

The disclosed exemplary system, depicted in FIG. 10, consists of four broad functional areas: (a) a search component 320 for seeking out and detecting steganographic communications, (b) a decode component 322 to reveal the content of detected messages, (c) a decryption component 324 to decrypt the hidden content, should it be encrypted, and (d) a server component 326, which coordinates system operations and allows an operator to control the system and receive the results of those operations in convenient form.

The search 320, decode 322 and decryption 324 components are designed to function as collections of distributed processing elements under the direction of the server 328, 330 and 332, respectively, for searching, decoding or decrypting services. Each of these functions is bandwidth and/or computationally intensive. The distributed approach offers an economical approach to large scale computing, and offers other operational benefits as well. The server contains distinct logical components for controlling the search, decode, and decryption functions, which themselves may be implemented as elements of server cluster.

The administrative console 334 provides a critical component of the server system 326, for it must present a concise interface for controlling a complex distributed system, as well as provide intelligible reporting on system operations.

Search and detection is directed by the search server 328 under control of the settings supplied through the administrative console 334, such as those embodied in command packet 336 or response packet 338. The search server 328 controls data acquisition across all protocols and distribution systems, such as HTTP, FTP, and USENET.

The disclosed system provides the ability to schedule search frequency for individual data sources 340 (e.g. individual web sites or news groups) or groups of sources 342 (e.g. families of news groups or sets of web sites). The system provides the ability to automatically distribute the work of searching individual web sites among distributed clients 320, 322, 324.

Figure 11:
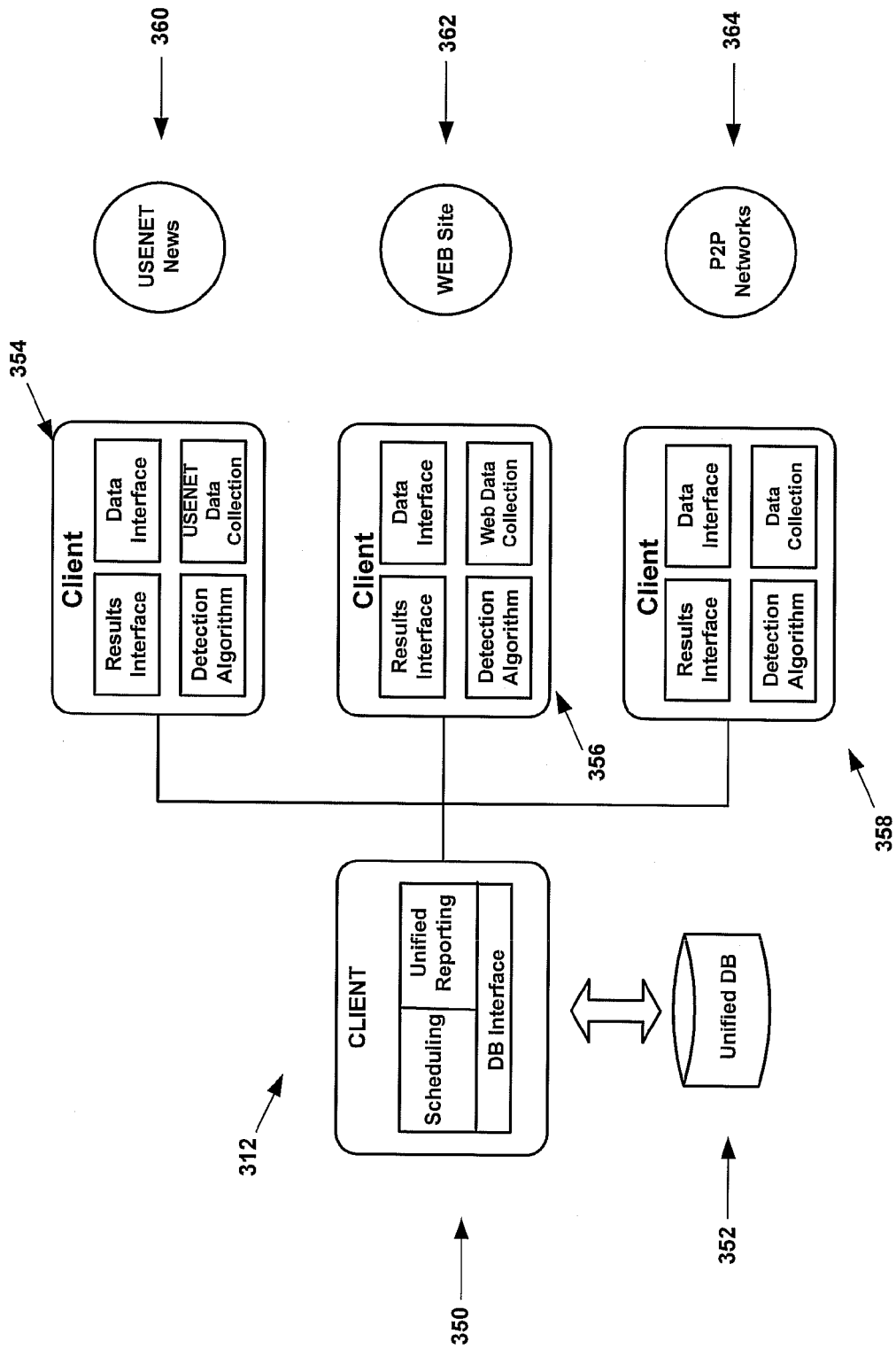
FIG. 11 depicts a flow chart diagram depicting of the operational configuration and components comprising an aspect of the present invention.

FIG. 11 depicts a diagram representing the distribution of some of the functionality that the server and clients possess in carrying out their assigned tasks. Server 350 performs such task as scheduling, unified reporting and database interfacing with database 352. Client 354 is capable of performing such task as result interfacing, data interfacing, executing a detection algorithm and USENET data collection from USENET News sites 360. Client 356 is capable of performing such task as result interfacing, data interfacing, executing a detection algorithm and Web data collection from Web sites 362. Client 358 is capable of performing such task as result interfacing, data interfacing, executing a detection algorithm and data collection from P2P Networks 364.

Distributing the scanning workload across clients at the web-page level may be a challenge. Common web crawler scanning algorithms are a self-contained process of parsing HTML pages, extracting links to images and other pages, and thus building a map of an entire web site. This process is fast and efficient but has the disadvantage of causing the target site to be traversed in its entirety by a single client IP address. Dividing the scanning work among many clients makes the operation of traversing an entire web site appears to be nothing more than the typical brief browsing events by many different clients, as depicted in FIGS. 10 and 11. This is complex because one cannot know in advance what pages are available on a site without first browsing it, so the scanning task cannot simply be divided among many clients by the server prospectively.

One client must survey the main page, and along with the results of its image analysis, return the links found on the page. The server 350 can then pass these links to other clients, which performs the same analysis process and each return more results and new page links. The server 350 must keep track of which pages have been visited so that the search clients do not drive up the target site's bandwidth usage or hit counts.

The process of scanning a targeted site can be modeled by employing the following algorithm. If the pool of available clients to the server is n and "i" is defined as an integer value from 1 to "n" and "C" the data gathered by a client then $$\sum_{n}^{i} C_n$$

would represent the summation of the data from the targeted site by the clients. It should be noted that if "n" clients are available to the server they might not all be required to completely analyze the site. Additionally, the available "n" clients may not be great enough to completely scan the site, therefore some clients may be utilized multiple times to complete the task at hand.

In the situation where a client must be utilized multiple times, the present invention contemplates the client visiting the site multiple times in a short span of time or perusing multiple sections of the site to mimic the browsing of an ordinary user. Additionally, in order not to raise undue attention to the process, the present invention can randomly send a client at differing time intervals to the site to mask the analysis process.

The present system provides the ability to specify scan scheduling for specific media (without traversing the entire site) more frequently than the monitoring schedule for the site as a whole. This feature serves to reduce the profile of scanning activity on target sites while continuing to provide information on key items.

Figure 12:
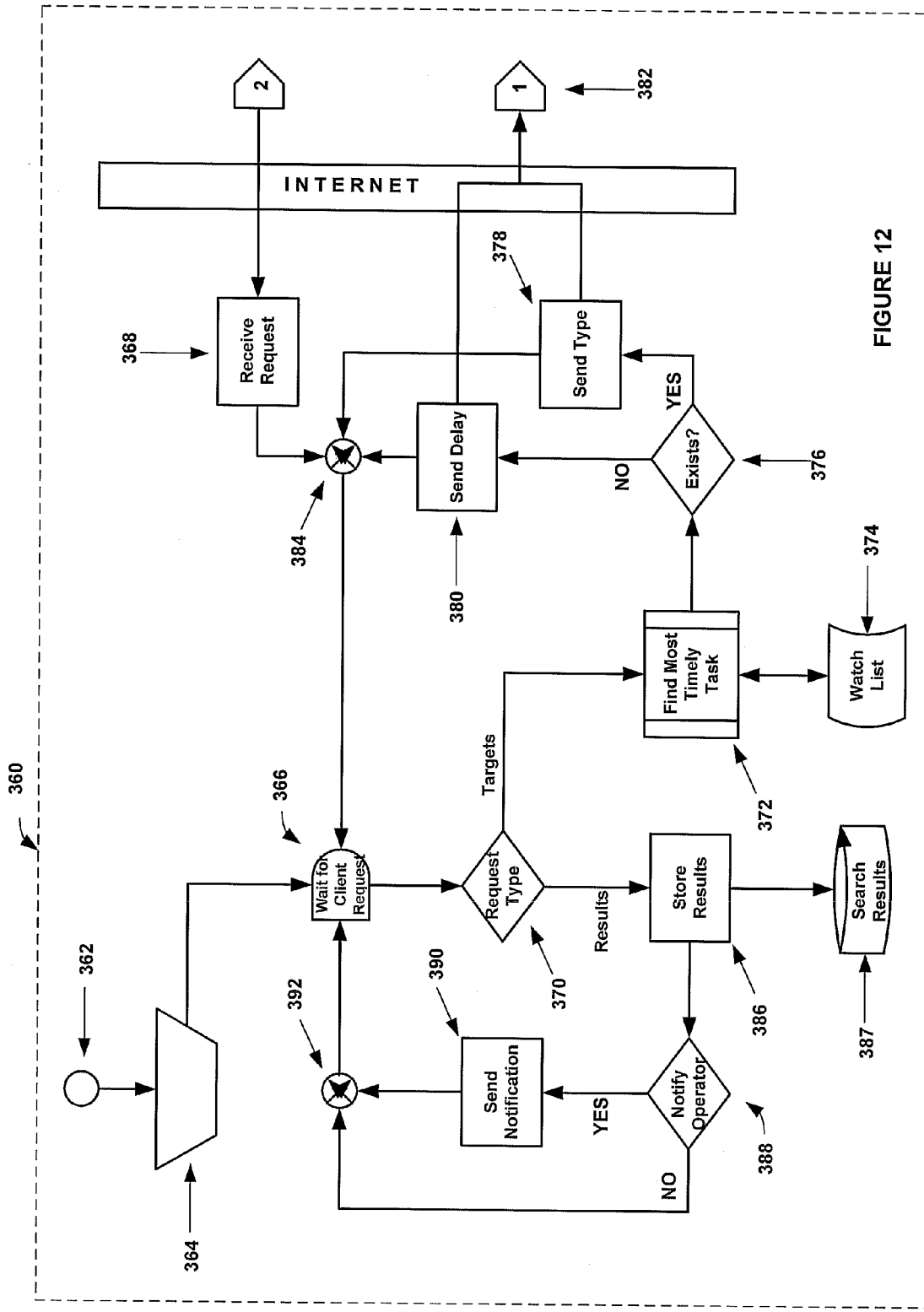
FIG. 12 depicts a schematic flow chart diagram of the server operational processes of an aspect of the present invention.

FIG. 12 depicts a flow diagram 360 showing control flow for the search server 328, see FIG. 10. System parameters are entered via terminal 362, which configures and initializes the server at control point 364. Control then passes to control point 366, which places the system in a standby mode waiting for a client request. When a requests is receive by the system via control point 368 the request is forward to control point 366, which in turn forwards the request to control point 370. Control point 370 determines what type of action to take. If the request is to target a site, control passes to control point 372, which determines most timely task to execute. Control point 372 then passes data to or receives data from a watch list module 374. Either before or after interfacing with module 374 (order is not restrictive in this case), control passes to control point 376 where a determination is made as to whether a steganographic message is found. Control then passes to control point 378, which sends a target. A response is also sent to clients at control point 382.

If control point 376 determines a steganographic message not found control passes to control point 380 which transmit a delay to summer 384 and clients 382. Control then passes to control point 366 where the system once again is in standby mode. Referring back to control point 370, if the request type is a result, control passes to control point 386, which in turn stores the results in the search results module 387. Control then passes to control point 388 where a determination is made whether or not to notify an operator. If the decision is yes, control passes to control point 390, which in turn sends a notification to the operator. If the decision is no, control is passed back to control point 366, where again the system is placed in standby mode.

Figure 13:
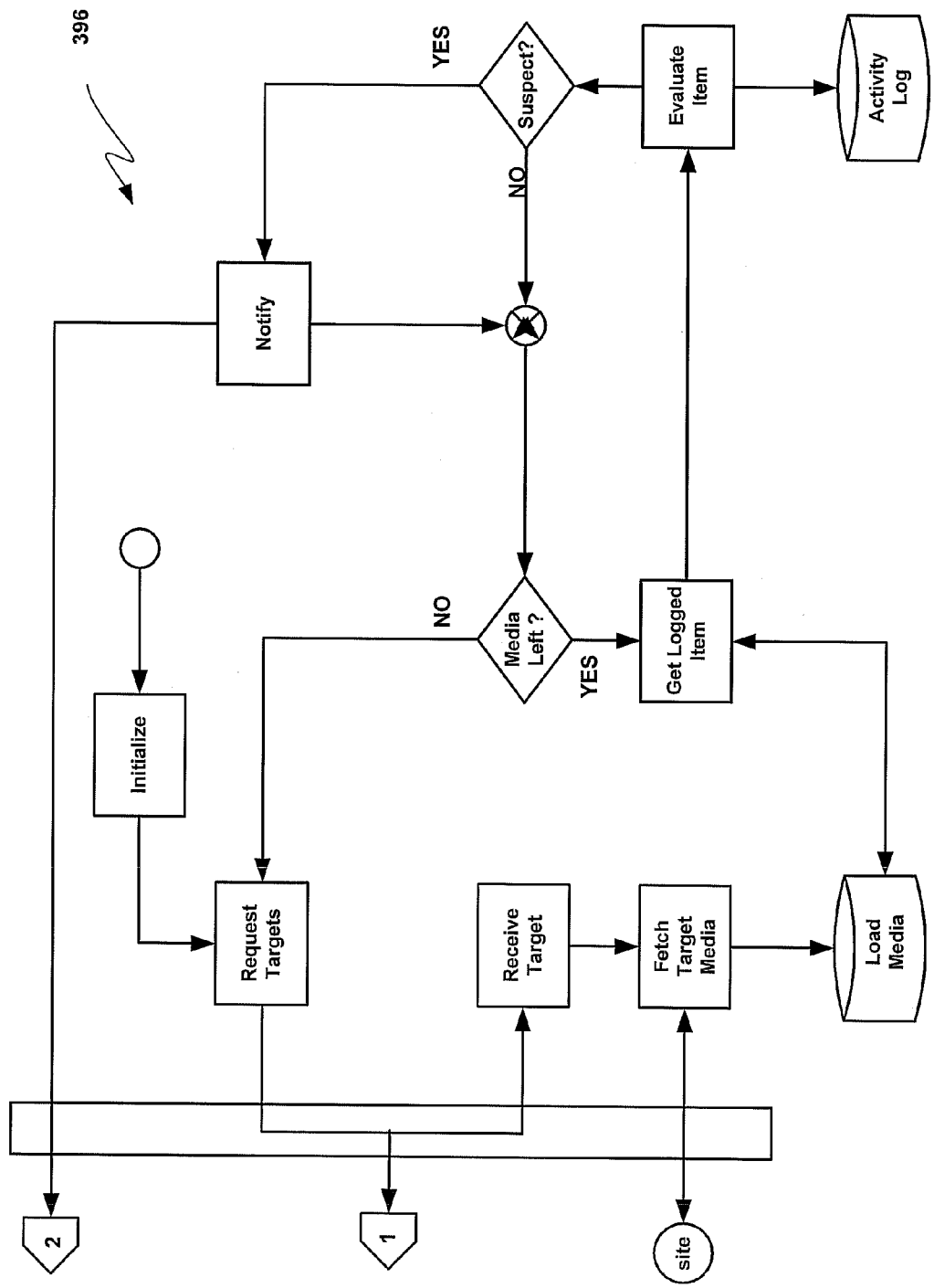
FIG. 13 depicts a schematic flow chart diagram of the client operational processes of an aspect of the present invention.

FIG. 13 depicts a flow diagram 396 illustrating the control flow for the search client 320. The flow process 396 is straightforward and will not be described in detail at this time. It should be noted that the search client process is monitored and controlled by the search server 328.

FIGS. 14 and 15 depict tables detailing message format exchanges between the client and server, respectively. In particular, the table of FIG. 14 provides a server command message for search clients and FIG. 15 provides a client service record for one embodiment of the present invention.

The present system provides both automated and semi-automated support for revealing the content of steganographic media. In cases where the encoding program can be reliably determined, the server passes the media to the decoding array for automatic decoding. In cases where the originating algorithm cannot be determined, techniques requiring a much greater resource commitment are useful, and a solution may be more difficult. The media and contextual information are passed to a prioritized queue for operator review and decision of which items to commit resources.

The decoding subsystem 322, see FIG. 10, consists of a framework for controlling a suite of publicly available steganography programs. Since the content of steganographic messages may be encrypted, the present system provides a decryption subsystem 324. This subsystem may be implemented as a distributed processing array for conducting brute force attacks, or may simply forward the data to other specialized external systems.

The client software enables new operational modes that may be presented as user options or may be handled through customized installers. The operator of the client computer may be presented with some options regarding how the client may operate, such as whether to use the proxy service, the priority of the client process, and whether to execute as a silent background process, or as a foreground process. Bandwidth constraints may indicate the need to provide some control over reporting options at the client level, such as whether to log all media and test results with the server, or only positive results. Server operations are controlled via a web interface.

Various modifications to these embodiments will be readily apparent to those skilled in the art, and the generic principles defined herein may be applied to other embodiments without the use of the innovative faculty. Thus, any claimed subject matter is not intended to be limited to the embodiments shown herein but is to be accorded the widest scope consistent with the principles and novel features disclosed herein.

We claim:

1. A method for detecting and analyzing sites suspected of transferring steganographic communications, the method comprising the steps of:

analyzing a suspected site for steganographic communications at the direction of a server wherein the steganographic communications have been previously encoded using a steganographic encoding process, and further wherein the server initiates the analyzing prior to identifying the steganographic encoding process to surreptitiously surveil the hiding of subversive communications by the suspected site based on parameters provided by the server, wherein the server directs a plurality of clients to collectively analyze the suspected site;

directing a first client to analyze a portion of the suspected site, wherein the first client analyzes the suspected site based on said parameters of the server and wherein the first client analyzes the suspected site prior to identifying the steganographic encoding process and wherein the first client returns results of the analysis to the server;

dispatching a second client from the plurality of clients to analyze a portion of the suspected site based on the results of the first client and said parameters of the server and wherein the second client returns results of the analysis to the server;

repeating the dispatching step for each of the plurality of clients utilized in the analysis until the server operational parameters for analyzing the suspected site have been satisfied; and aggregating the results from the plurality of clients and analyzing the results to determine if a steganographic communication is present at the suspected site.

2. The method of claim 1, wherein the suspected site is chosen by at least one of randomly, from a watch list and directly targeted.

3. The method of claim 2, further including the step of analyzing data in a suspected site for at least one of statistical variations and signatures that may indicate that the data has undergone a steganographic process.

4. The method of claim 3, wherein statistical variations and signatures includes at least one of increase entropy of redundant data, changes in histogram color frequencies, alterations of a DCT coefficient histogram or other changes in characteristics of the signature of a steganographic encoding process.

5. The method of claim 2, further including the step of contextual monitoring the suspected site.

6. The method of claim 5, wherein the step of contextual monitoring includes at least one of updating a media file without changing of the media files name, removal of media files only, removal of branches of the suspected sites structure, or other patterns of image manipulation.

7. The method of claim 1, wherein the step of dispatching clients to analyze the suspected site is performed sequentially until the server analysis parameters are satisfied.

8. The method of claim 7, further including the step of analyzing data in a suspected site for at least one of statistical variations and signatures that may indicate that the data has undergone a steganographic process.

9. The method of claim 8, wherein statistical variations and signatures includes at least one of increase entropy of redundant data, changes in histogram of color frequencies and alterations of a DCT coefficient histogram.

10. The method of claim 1, wherein the analysis of the suspected site includes at least one of data files, audio files, video files and graphic files.

11. The method of claim 1, further including the step of:
decoding found steganographic communications located in the analyzing step.

12. The method of claim 11, wherein the decoding step is performed by applying at least one of a known reversing steganographic techniques, exploiting weaknesses in a steganographic algorithm and brute force attack.

13. The method of claim 12, further including the step of decrypting decoded steganographic communications.

14. The method of claim 1, wherein the external site is at least one of a Usenet news server, a Web site, or a Peer-to-Peer network.

15. The method of claim 1, wherein the analyzing step further includes analyzing a suspected site for steganographic communications at the direction of a server, wherein the server directs $$\sum_{n}^{i} C_n$$

clients (where i=1, 2, 3 ... n) to analyze the suspected site;
  directing client $C_i$ to analyze a portion of the suspected site, wherein the client $C_i$ analyzes the site based on parameters provided by the server and wherein the client $C_i$ returns results of the analysis to the server;
  (i) directing client $C_{i+1}$ to analyze a portion of the suspected site based on the results of client $C_i$ and the parameters provided by the server and wherein the client $C_{i+1}$ returns results of the analysis to the server;
  repeating step (i) until the parameters for analyzing the suspected site have been satisfied; and
  aggregating the results from the plurality of clients and analyzing the results to determine if a steganographic communication is present.

16. The method of claim 15, wherein the suspected site is chosen by at least one of randomly, from a watch list, and directly targeted.

17. The method of claim 16, further including the step of analyzing data in a suspected site for at least one of statistical variations and signatures that may indicate the data has undergone a steganographic process.

18. The method of claim 15, further including the step of:
  decoding found steganographic communications located in the analyzing step.

19. The method of claim 18, wherein the decoding step is performed by applying at least one of a known reversing steganographic techniques, exploiting weaknesses in a steganographic algorithm and brute force attack.

20. The method of claim 19, further including the step of decrypting decoded steganographic communications.

21. A method for detecting and analyzing sites for transference of steganographic encoded data, the method comprising the steps of:
  means for detecting steganographic encoded data at a suspected site wherein the steganographic encoded data has been previously encoded using a steganographic encoding process, and further wherein the means for detecting initiate prior to identifying the steganographic encoding process; and
  means for directing a pool of a plurality of clients to surreptitiously surveil the hiding of subversive communications by the suspected site by a server based on parameters provided by the server, wherein each client is assigned an analysis task by the server based on objectives of the server comprising said pool that have analyzed a portion of the suspected site;
  means for collectively analyzing the suspected site by dispatching a second client from said pool to analyze a portion of the suspected site based on results returned by a first client from said pool and the parameters of the server;
  means for repeating the dispatching step for each of the plurality of clients utilized in the analysis until the server operational parameters for analyzing the suspected site have been satisfied; and
  means for aggregating the results from the plurality of the clients from said pool to determine if steganographic encoded data is present at the suspected site.

22. A software product embedded on a computer readable storage medium capable of instructing a computer system, wherein the software product comprises:
  an instruction set to analyze a suspected site for steganographic communications wherein the steganographic communications have been previously encoded using a steganographic encoding process, and further wherein the analysis initiates prior to identifying the steganographic encoding process to surreptitiously surveil the hiding of subversive communications by the suspected site based on parameters provided by a central server;
  an instruction set to communicate with and direct a plurality of client servers to aid in analyzing the suspected site;
  and instruction set communicated to each of the plurality of client servers to collectively analyze a portion of the suspected site and return results of the analysis to the central server, wherein the dispatched client server analyzes the suspected site based on said parameters of the central server;
  an instruction set dispatching subsequent client servers from the plurality of remaining client servers to analyze unanalyzed segments of the suspected site based on the results of the previous client servers that have been dispatched to analyze the suspected site and operational parameters of the central server, wherein the instruction set is repeated until the central server operational parameters are met; and
  an instruction set to aggregate the results from the plurality of client servers and analyzing the results to determine if steganographic encoded data is present at the suspected site.

* * * * *

UNITED STATES PATENT AND TRADEMARK OFFICE
CERTIFICATE OF CORRECTION

PATENT NO. : 7,644,283 B2
APPLICATION NO. : 11/420665
DATED : January 5, 2010
INVENTOR(S) : William W. Cowan, Steven Rogers and William H. Rice It is certified that error appears in the above-identified patent and that said Letters Patent is hereby corrected as shown below:

"On the title page, Item [76], inventor's name should read William H. Rice."

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO.        : 7,644,283 B2                                               Page 1 of 1
APPLICATION NO.   : 11/420665
DATED             : January 5, 2010
INVENTOR(S)       : Cowan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 568 days.

Signed and Sealed this

Twenty-first Day of December, 2010

David J. Kappos
*Director of the United States Patent and Trademark Office*